United States Patent [19]
Rimbach, Jr.

[11] 3,786,199
[45] Jan. 15, 1974

[54] MIXED TRAFFIC MOBILE RADIO SYSTEM

[75] Inventor: Andrew Rimbach, Jr., Monmouth Beach, N.J.

[73] Assignee: Bell Telephone Laboratories, Incorporated, Murray Hill, Berkeley Heights, N.J.

[22] Filed: Oct. 22, 1971

[21] Appl. No.: 191,931

[52] U.S. Cl. .................................................. 179/41 A
[51] Int. Cl. .............................................. H04m 7/04
[58] Field of Search ...................... 179/41 A, 18 BG, 179/15 AS, 27 D, 27 FH

[56] References Cited

UNITED STATES PATENTS

| | | | |
|---|---|---|---|
| 3,297,829 | 1/1967 | Germanton | 179/27 D |
| 3,334,191 | 8/1967 | Arseneau et al. | 179/27 D |

*Primary Examiner*—William C. Cooper
*Assistant Examiner*—Thomas L. Kundert
*Attorney*—W. R. Keefauver et al.

[57] ABSTRACT

In order to merge telephone traffic and dispatch traffic into a common network without degrading either type of service over that enjoyed in separate systems, dispatch type traffic is somewhat degraded during particular high traffic situations. The telephone traffic is served upon demand except when no communication channels are available for assignment. The identity of each requesting dispatcher is read into a queuing buffer to await service. So long as more than a predetermined number of channels are available, the dispatch calls are read out of the buffer virtually upon their receipt. Whenever fewer than the predetermined number of channels are available, pulses which energize the service of dispatch calls are subjected to a time delay. After that delay, so long as any channel is still available, the next dispatcher in queue is served.

2 Claims, 1 Drawing Figure

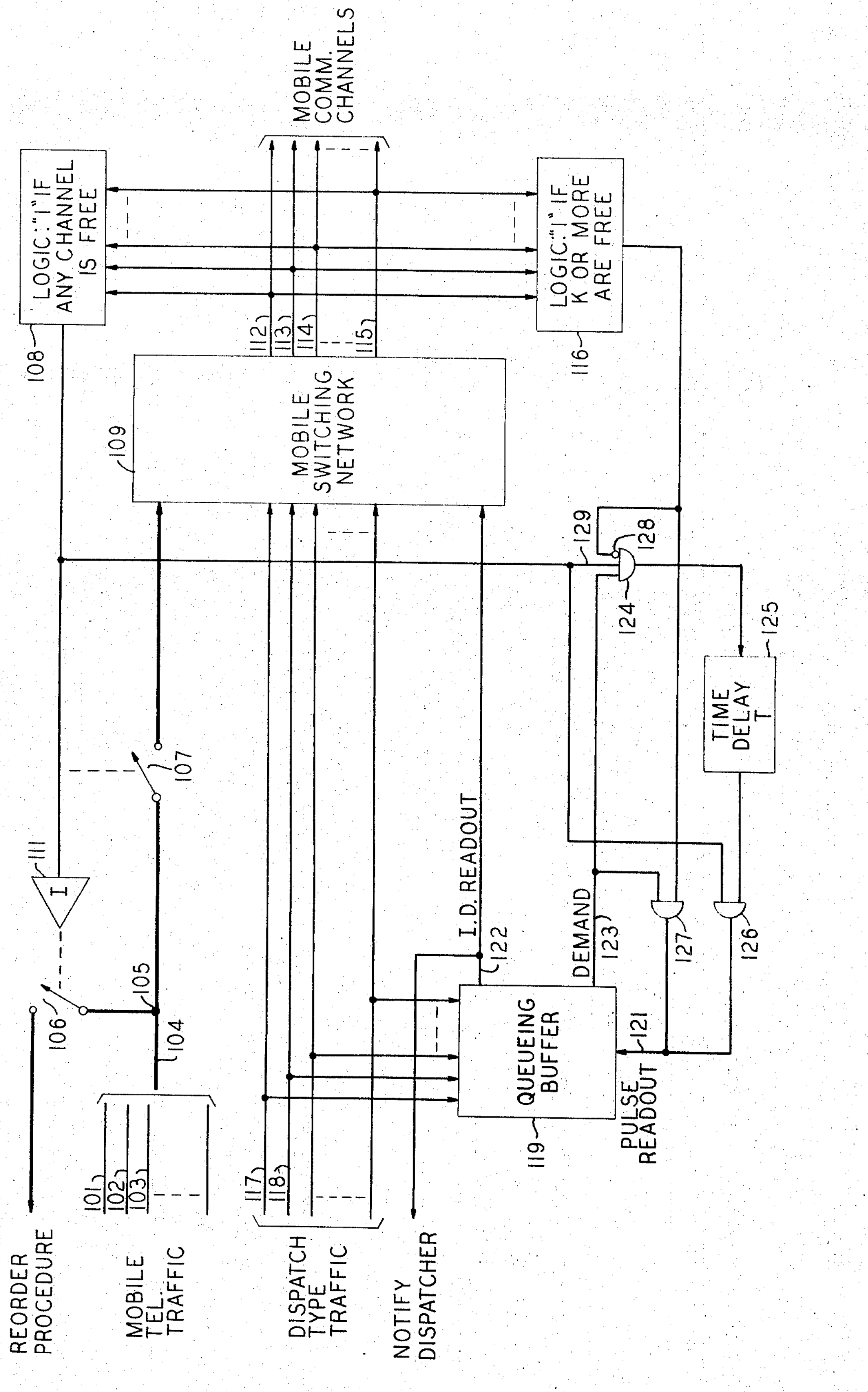
REORDER PROCEDURE
MOBILE TEL. TRAFFIC
DISPATCH TYPE TRAFFIC
NOTIFY DISPATCHER
MOBILE COMM. CHANNELS
LOGIC: "1" IF ANY CHANNEL IS FREE
LOGIC: "1" IF K OR MORE ARE FREE
MOBILE SWITCHING NETWORK
QUEUEING BUFFER
TIME DELAY T
I.D. READOUT
DEMAND
PULSE READOUT
I
101
102
103
104
105
106
107
108
109
111
112
113
114
115
116
117
118
119
121
122
123
124
125
126
127
128
129

MIXED TRAFFIC MOBILE RADIO SYSTEM

BACKGROUND OF THE INVENTION

This invention relates to mobile communication systems. More particularly, it relates to those systems having a sufficiently high channel capacity to allow for simultaneous service of telephone type traffic and dispatch type traffic.

In presently utilized radio dispatch systems, each dispatcher is accorded a private line to the central dispatching office. Thus, whenever he desires to dispatch a call, he closes his loop to the central dispatch network, indicating that he desires to be accorded a communication channel. If such requests occur at a time when service cannot be immediately rendered, prospective service requests are placed in a queue. Thereafter, the queued calls are served as communication channels become available. Of course, if the queue is empty and a channel is immediately available, it is assigned directly. Thus, present day dispatch systems may be characterized by a guarantee of service with the reservation that such service may not be immediate.

In presently utilized mobile telephone systems, calls are generally handled on an immediate service basis. That is, since the telephone call must be processed by way of a telephone central office, and since the location of prospective mobile users is generally very unpredictable, each customer does not have a unique access route to the central system. Rather, connections to the central office and to the channel assignment mechanism are flexibly established each time a customer indicates that he desires service. Accordingly, if a channel is immediately available, it is assigned. On the other hand, only in the case in which no channel is found to be immediately available is the customer refused service.

Until recently, the very limited capacities of mobile communication systems rendered the prospect of a combined telephone and dispatch system merely one of academic interest. With the advent of wide area high capacity mobile communications systems, however, the combination of dispatch type traffic and telephone type traffic has become a very viable possibility. Not only would such a combination simplify the amount of equipment required for each class of service, but it would undoubtedly increase the operational efficiency of the high capacity system. Since all channels are flexibly available to any traffic, the necessity of fixed assignment to given classes of traffic is obviated. The goal of any combined system, therefore, would be to serve both classes of traffic at least as well as they are presently served in entirely separate systems.

If the two types of system were to be simply merged into a single high capacity system, it is very unlikely that the telephone traffic would receive service comparable to that which it presently receives in telephone-only type of systems. That is, since the dispatch type calls are guaranteed service provided they wait in queue until one becomes available, they would nearly always be the recipient of available channel assignments. In such a case, telephone calls would be served only if they occurred when the queue was empty or, when the queue was occupied, if they occurred during an interval between termination of one call and subsequent service of a queued dispatch call. Thus, the dispatch type calls would very likely dominate the channel assignment mechanism.

While the prior art shows few attempts actually to combine telephone type traffic with dispatch type traffic, it does show several schemes for generally serving two classes of traffic having different priorities. Nearly all of these systems, however, feature an interrupt capability for the high priority class. That is, if a low priority item is being served when a high priority item requests service, these systems interrupt the low priority service and replace it with the higher priority service. Since it is a goal of merged dispatch and telephone systems to retain the quality of service which they enjoyed in separate systems, an interrupt type approach is quite unsatisfactory.

Accordingly, it is an object of the present invention to provide a combined dispatch and telephone mobile communication system wherein both classes of traffic receive service which is at least as good as that which they enjoyed in separate systems. It is a further object that this combined system be embodied without requiring an interrupt approach to maintaining the various priorities of service.

SUMMARY OF THE INVENTION

The present invention enables the combination of dispatch type traffic with telephone type traffic into a single high capacity mobile communications sytem. By regulating the dispatch type traffic in certain circumstances, both classes of traffic receive service which is at least equivalent to that afforded by separate systems serving either class.

More particularly, the present invention accomplishes this goal by subjecting dispatch type traffic to a time delay of predetermined length prior to giving it service during the times when the system exceeds a certain degree of busyness. Of course, if a large number of channels are available for assignment, both telephone type calls and dispatch type calls are served immediately as they are received. If, however, more than a predetermined number of channels are in service, the dispatch type traffic is somewhat delayed while the telephone type traffic is still served immediately upon demand.

In an illustrative embodiment of the present invention, first and second logic circuits respectively determine whether any channels are free and whether more than a predetermined number are free. If the first logic circuit determines that no channels are free, telephone type traffic receives a reorder command. At all other times, telephone traffic is channeled directly to a channel assignment network. The identities of dispatchers requesting service are in all situations first conveyed to a queuing buffer. If the second logic circuit determines that more than the predetermined critical number of channels are free, they are passed immediately through the buffer to the channel assignment network. Otherwise, they remain queued, awaiting assignment orders. That is, gating means, upon occurrence of a "not empty" condition in the buffer, causes dispatch service requests to be immediately passed on for channel assignment whenever the second logic circuit has an output of a logical one, indicating more than the predetermined number of free channels. Other gating means, upon simultaneous occurrence of a "not empty" condition in the queuing buffer, a logical one condition from the first logic circuit indicating that at least one channel is free, and a logical zero from the second logic circuit, energizes a time delay circuit. After the time delay has elapsed, and if the output of the first logic circuit is still a logical one, the next dispatch call in queue is served by the channel assignment network.

It is a feature of the present invention that neither dispatch type traffic nor telephone type traffic ever receives service worse than that expected in discrete type systems. Moreover, trunking efficiencies enabled by the combination of both classes of traffic into a single network generally elevate the quality of service accorded each class to a level well above that demonstrated by individual systems. It is another feature of the present invention that the combination of both classes of traffic increases the operational efficiency of the high capacity mobile communication systems. All channels are available to both classes of traffic, thereby obviating fixed channel to traffic class assignments.

DETAILED DESCRIPTION

At the heart of the system shown in the drawing is a mobile switching network 109. It is a function of the mobile switching network to supervise and actuate the allocation of communication channels. For example, the mobile switching network 109 may be embodied by certain apparatus described in a U.S. Pat. No. 3,663,762 to A. E. Joel, Jr., issued May 16, 1972. That application describes a high capacity mobile communication system wherein communication channels are flexibly assigned throughout the system. The following describes its operation with additional provision being made for dispatch type calls. A mobile switching central office is served by trunks from other central offices, bearing both telephone and dispatch type traffic. In addition, individual lines from local dispatchers are connected into the mobile switching central office. The system features a plurality of spatially disparate mobile base stations which serve to complete the connection with mobile transceivers, either of the telephone or of the dispatch type. Trunks individually connect the mobile switching central office with the various base stations. This discussion shall assume that mobile-to-dispatcher requests are relayed back to the dispatcher, whereupon to establish a call the dispatcher must proceed as he normally does to make a connection.

In the drawing, the mobile switching network 109 represents an entire base station. Accordingly, the traffic which is received from the mobile switching central office is of two types, mobile type traffic and mobile dispatch type traffic. In the drawing, these two types of traffic are shown separated. This separation may be accomplished either at the mobile switching central office, or at a separator located at the base station. The mobile telephone traffic is shown on lines 101, 102, 103, etc., and combined into a cable 104. Similarly, the dispatch type traffic is shown on lines 117, and 118, etc. At the output of the mobile switching network 109 is a plurality of lines 112, 113, 114, 115, etc., which are labeled "mobile communication channels." These channels represent the service channels of the above mentioned patent application. Accordingly, the connections which are conveyed to the inputs of logic circuits 108 and 116 may in fact represent connections inside the service channel unit.

The logic circuits 108 and 116 merely sense the use status of the mobile channels 112 through 115, etc. Whenever a predetermined number of channels are free, each of the circuits assumes a logical 1 output condition; otherwise, they assume a logical 0 output condition. More particularly, logic circuit 108 assumes a logical 1 output if any of the channels 112 through 115, etc., are free. Similarly, logic circuit 116 assumes a logical 1 output if at least a predetermined number of channels, designated as K, are free. The value of K may be chosen in accordance with the amount of each type of traffic which is anticipated. Both logic circuits 108 and 116 may be embodied as a symmetrical switching network such as the one shown and described at pages 167 and 168 of "Introduction to the Logical Design of Switching Systems" by H. C. Torng, Addison Wessley Publishing, Reading, Mass., 1964.

A plurality of lines 101, 102, 103, etc., are labeled as mobile telephone traffic. Thus, these lines represent incoming requests for a communication channel to complete mobile telephone calls, including telephone calls from a nonmobile caller to a mobile subscriber by way of a telephone central office, or calls from a mobile radio subscriber to another party. The plurality of lines 101, 102, 103, etc., are shown in the drawing as a cable 104. At node 105 the cable 104 divides, one branch representing the routing of calls for utilization of a reorder procedure and the other representing the routing of calls which are to be served. Thus, complementary switches 106 and 107, operating under the control of a logic circuit 108, determine the routing of the mobile telephone traffic. That is, whenever the output of logic circuit 108 is a logical 1, switch 107 is closed, thereby routing calls directly to a mobile switching network 109. A logical 1 output from the logic circuit 108 also causes switch 106 to be opened, since an inverter 111 transposes the logical 1 from circuit 108 to a logical 0. Conversely, a logical 0 condition from logic circuit 108 causes switch 106 to be closed and switch 107 to be opened. The latter condition results in mobile traffic being processed by a reorder procedure wherein they receive a termination of their connection, indicating that they must try again if they wish to receive service.

In summary, a logical 1 condition at the output of logic circuit 108 represents the fact that at least one channel is free, and the consequent closure of switch 107 and opening of switch 106 causes any incoming telephone traffic to be served upon demand. Only whenever the output of logic circuit 108 is a logical 0, indicating that no channels are free for assignment, is switch 107 opened and switch 106 closed, causing incoming telephone traffic to receive a reorder command. Thus, the operation of logic circuit 108 in conjunction with inverter 111 and switches 106 and 107 may be seen to accord mobile telephone traffic immediate service so long as any mobile communication channels are free and available for assignment.

The lines 117, 118, etc., representing dispatch type calls, bear an index which identify the dispatcher who is seeking to have his call served. This index is transmitted by the mobile switching central office to a base station from which the call will be completed. The function served by these indices will be clear from the following discussion. The lines 117, 118, etc. are conveyed individually to the mobile switching network 109. In addition, each is conveyed to a queuing buffer 119.

The principal function served by the queuing buffer 119 is to store the index of a dispatcher upon receipt from the mobile switching central office of a service demand. Moreover, it is desirable that the queue be constructed such that the indices of requesting dispatchers are stored in the order of their receipt. For example, the queuing buffer 119 may be substantially embodied by an asynchronous delay line such as the one described in U.S. Pat. No. 3,099,819 to D. H. Barnes. The Barnes patent describes a mechanism which includes a plurality of cells, each of which is capable of storing a digital word of predetermined length. Whenever a digital word is presented at the input end of the line, it is automatically transferred down the line of cells to the unoccupied cell which is nearest the readout end. After a readout pulse is received, causing the digital word in the last cell to be pulsed out, the information in each full storage cell is transferred to the subsequent cell.

In order to realize the proper operation of the buffer 119, the only major addition to the Barnes apparatus which would be required is an analog-to-digital converter which digitally encodes the index corresponding to a requesting dispatcher so that digital words may be read into the queuing apparatus. Thus, input terminal 121 in the drawing is the terminal which energizes the readout of a digital word at output terminal 122. Each time a pulse is received at terminal 121, a digital word is conveyed via readout terminal 122 to the mobile switching network. Subsequently, each digital word still in the queue is advanced to the next open storage cell. The drawing also shows an output terminal 123 which is labeled "demand." It is envisioned that demand terminal 123 be the output of sampling apparatus which samples the occupancy status of the last storage cell in the queue at the desired maximum readout rate of said queue. If a digital word is stored in the last cell at a sampling time, the demand terminal 123 emits a pulse, corresponding to a logical 1 condition. If no digital word is stored in the last cell at a sampling time, demand terminal 123 emits no pulse, corresponding to logical 0 condition.

Receipt by the mobile network 109 of the dispatcher index by way of readout terminal 122 causes the line associated with that dispatcher to be connected to one of the mobile communication channels 112 through 115, etc. In addition, since it is conceivable that the index of the dispatcher has been in queue for a substantial length of time, the readout signal at terminal 122 is also conveyed back to the dispatcher via the mobile switching central office. This conveyance gives him notice that a communication channel is to be accorded him, and that he should therefore prepare to commence his call.

The foregoing apparatus and procedures have defined the basic processing and routing of dispatch type calls and telephone type calls in embodiments of the present invention. Thus, mobile telephone traffic is served immediately as long as any communication channel is free. Dispatch type traffic, on the other hand, is guaranteed eventual service, but no dispatch call may be completed until it has waited its turn in the queuing buffer 119. Moreover, no dispatch type call is enabled except when the queuing buffer 119 receives a readout enabling pulse at input terminal 121.

The apparatus which particularly determines whenever the queuing buffer receives a readout enabling pulse includes a series of AND gates 124, 126 and 127, and a time delay circuit 125. The AND gates 124, 126 and 127 and the timing circuit 125 all operate in response to three distinct items of information: first, the state of buffer demand terminal 123, indicating whether any dispatchers are awaiting service; second, the output state of logic circuit 108, indicating whether any channel is free; and third, the output of logic circuit 116, indicating whether at least K channels are free. More particularly, readout enabling terminal 121 receives pulses individually from AND gates 126 and 127, a pulse from each corresponding to a distinct situation.

A pulse is received at terminal 121 from AND gate 127 whenever demand terminal 123 and the output of logic circuit 116 both assume logical 1 conditions. In other words, a pulse from demand terminal 123 is conveyed through AND gate 127 to terminal 121 whenever logic circuit 116 assumes a logical 1 output condition. Thus, so long as at least K channels are free, dispatch type traffic is served virtually on demand, since the logical 1 pulses from demand terminal 123 are undelayed as they are conveyed to terminal 121 via gate 127. If, however, the output of logic circuit 116 is a logical 0, AND gate 127 is disabled, and no pulses from demand terminal 123 may be conveyed to terminal 121 via gate 127. Under this condition, dispatch type calls are not served immediately upon demand, since they must rely on AND gates 124 and 126 in conjunction with time delay circuit 125 as a source of enabling pulses.

AND gate 124 is energized by three separate inputs. A first input 128 inverts the output of logic circuit 116. A second input 129 is coupled to the output of logic circuit 108. A third input of gate 124 is coupled to demand terminal 123. Thus, pulses from demand terminal 123 are conveyed through AND gate 124 only under the condition that the output of logic circuit 108 is a logical 1 and the output of logic circuit 116 is a logical 0. Of course, this corresponds to the situation when between 1 and K channels are free. Any pulses passing through AND gate 124 are coupled to the input of a time delay circuit 125. Circuit 125 subjects input pulses to a time delay of duration T, so a pulse from demand terminal 123 which passes through gate 124 is received at gate 126 a time period T later. The delay pulse may only be coupled by AND gate 126 to readout enabling terminal 121 if the output of logic circuit 108 is a logical 1. Thus, under the condition that between 1 and K channels are free, a demand pulse which is to enable service of the next dispatcher to be served is delayed by a time period T. Then, so long as any channels are free, that dispatcher receives service. If during the time delaying process all channels have been taken by mobile telephone traffic, service is not accorded, and the next dispatcher to be served must wait at least a time T again before he receives service.

It is evident from the foregoing how the principles of the present invention favor telephone type traffic during high demand periods such that dispatch type calls are prevented from dominating the channel assignment mechanism. Of course, when no conditions of crowding exist, both classes of traffic receive service virtually on demand. Whenever demand is high, and the predetermined number of channels are being utilized, the dispatch type traffic no longer receives immediate service. Rather, dispatch traffic receives a delayed service, as controlled by AND gates 124 and 126 in conjunction with time delay circuit 125. The net result is service which is at least equivalent to the service presently rendered in separate mobile telephone systems and mobile dispatch systems.

The foregoing is intended to be illustrative of the principles of the present invention. Many improvements and variations thereof may readily occur to those skilled in the art without departing from the spirit or the scope of the present invention.

I claim:

1. A mobile communication system for assigning communication channels to telephone type traffic and dispatch type traffic comprising:

first logic circuit means responsive to the use status of said communication channels for developing a predetermined logical state if any one of said communication channels is free for use;

means for servicing telephone type traffic upon demand if the predetermined logical state is developed by said first logic circuit means;

means for generating an energizing pulse in response to a condition of dispatch service demand including a buffer means for storing information corresponding to dispatch type calls in the order of their receipt, said information being sequentially read out for service upon receipt of an energizing pulse at an input terminal of said buffer means;

second logic circuit means responsive to the use status of said communication channels for developing a predetermined logical state if at least a predetermined number of channels are free, where the predetermined number is greater than one;

first gating means for coupling said energizing pulse from said means for generating to the input terminal of said buffer means if the predetermined logical state is developed by said second logic circuit means; and second gating means for delaying application of said generated energizing pulse to the input terminal of said buffer means by a fixed time delay if the predetermined logical state is developed by said first logic circuit means and the predetermined logical state is not developed by said second logic circuit means.

2. A mobile communication system for assigning communication channels to telephone type traffic and dispatch type traffic while maintaining both classes of traffic at an acceptably high level comprising:

first logic circuit means responsive to the use status of said communication channels for developing a predetermined logical state if any one of said communication channels is free for use;

means for serving telephone traffic on demand if the predetermined logical state is developed by said first logic circuit means;

means for generating an energizing signal in response to a condition of dispatch service demand including a buffer means for storing information corresponding to dispatch type calls in the order of their receipt, said information being sequentially read out for service upon receipt of an energizing signal at an input terminal of said buffer means;

second logic circuit means responsive to the use status of said communication channels for developing a predetermined logical state if at least a predetermined number of channels are free, where said predetermined number is greater than one;

first logic gating means for coupling said energizing signal from said means for generating to the input terminal of said buffer means if the predetermined logical state is developed by said second logic circuit means;

time delay means;

second logic gating means energized by concurrence of the predetermined logical state from said first logic circuit means and the absence of the predetermined logical state from said second logic circuit means for coupling said energizing signal from said means for generating to said time delay means; and third logic gating means for coupling to said input terminal of said buffer means a delayed energizing signal from said time delay means if the predetermined logical state is developed by said first logic circuit means.

* * * * *